US011494798B1

(12) United States Patent
Westhead et al.

(10) Patent No.: US 11,494,798 B1
(45) Date of Patent: Nov. 8, 2022

(54) FACILITATING THE APPLICATION OF A LEDGER TO PROGRAMMATICALLY IDENTIFY DUPLICATE DATA OBJECTS INDICATIVE OF MULTIPLE CARD-LINKED OFFERS PROVIDED AGAINST A SINGLE TRANSACTION

(71) Applicant: GROUPON, INC., Chicago, IL (US)

(72) Inventors: Martin Westhead, San Francisco, CA (US); Kyle Oppenheim, San Francisco, CA (US)

(73) Assignee: Groupon, Inc., Chicago, IL (US)

( * ) Notice: Subject to any disclaimer, the term of this patent is extended or adjusted under 35 U.S.C. 154(b) by 50 days.

(21) Appl. No.: 16/125,631

(22) Filed: Sep. 7, 2018

Related U.S. Application Data

(60) Provisional application No. 62/555,381, filed on Sep. 7, 2017.

(51) Int. Cl.
*G06Q 30/02* (2012.01)

(52) U.S. Cl.
CPC ................ *G06Q 30/0225* (2013.01)

(58) Field of Classification Search
CPC ........... G06Q 30/0255; G06Q 30/0254; G06Q 30/0269
See application file for complete search history.

(56) References Cited

U.S. PATENT DOCUMENTS

| | | | | |
|---|---|---|---|---|
| 2010/0088149 A1* | 4/2010 | Sullivan | ................ | G06Q 30/06 705/16 |
| 2012/0271712 A1* | 10/2012 | Katzin | ................ | G06Q 20/047 705/14.51 |
| 2013/0024267 A1* | 1/2013 | Libenson | ................ | G06Q 30/02 705/14.38 |
| 2014/0100929 A1* | 4/2014 | Burgess | ................ | G06Q 30/02 705/14.17 |
| 2015/0073989 A1* | 3/2015 | Green | ................ | G06Q 20/405 705/44 |
| 2015/0149308 A1* | 5/2015 | Lin | ................ | G06Q 20/227 705/16 |

(Continued)

OTHER PUBLICATIONS

"Fidel Card Linked Offers Platform" (Weatherseed, Tim Published on Jul. 17, 2018 on medium.com) (Year: 2018).*

*Primary Examiner* — James M Detweiler
(74) *Attorney, Agent, or Firm* — Alston & Bird LLP

(57) ABSTRACT

A method, apparatus and computer program products are provided for facilitating the application of a ledger, or data structure in general, to programmatically identify duplicate data objects, such as those indicative of card-linked offers provided against a single transaction, and more specifically, to the utilization of a global ledger to identify stacking of card-linked offers. One example method includes receiving an indication of an interaction between two devices, generating distributed ledger data, the distributed ledger data indicative of a previous interaction between the primary device and an entity, causing transmission of the distributed ledger data to each of a plurality of nodes in a offerer network, after a predetermined amount of time, causing performance of a comparison within the distributed ledger data to determine that the entity and a second entity comprise corresponding data objects, applying a rule to generate an adjusted value.

23 Claims, 8 Drawing Sheets

(56) References Cited

U.S. PATENT DOCUMENTS

| | | | | |
|---|---|---|---|---|
| 2015/0269624 A1* | 9/2015 | Cheng | ............... | G06Q 30/0261 |
| | | | | 705/14.58 |
| 2017/0364936 A1* | 12/2017 | Balfour | ............... | G06Q 20/204 |
| 2018/0150865 A1* | 5/2018 | Arora | ............... | G06Q 30/0207 |
| 2018/0349882 A1* | 12/2018 | White, III | ............ | G06Q 20/027 |
| 2019/0012695 A1* | 1/2019 | Bishnoi | ............... | G06Q 20/223 |

* cited by examiner

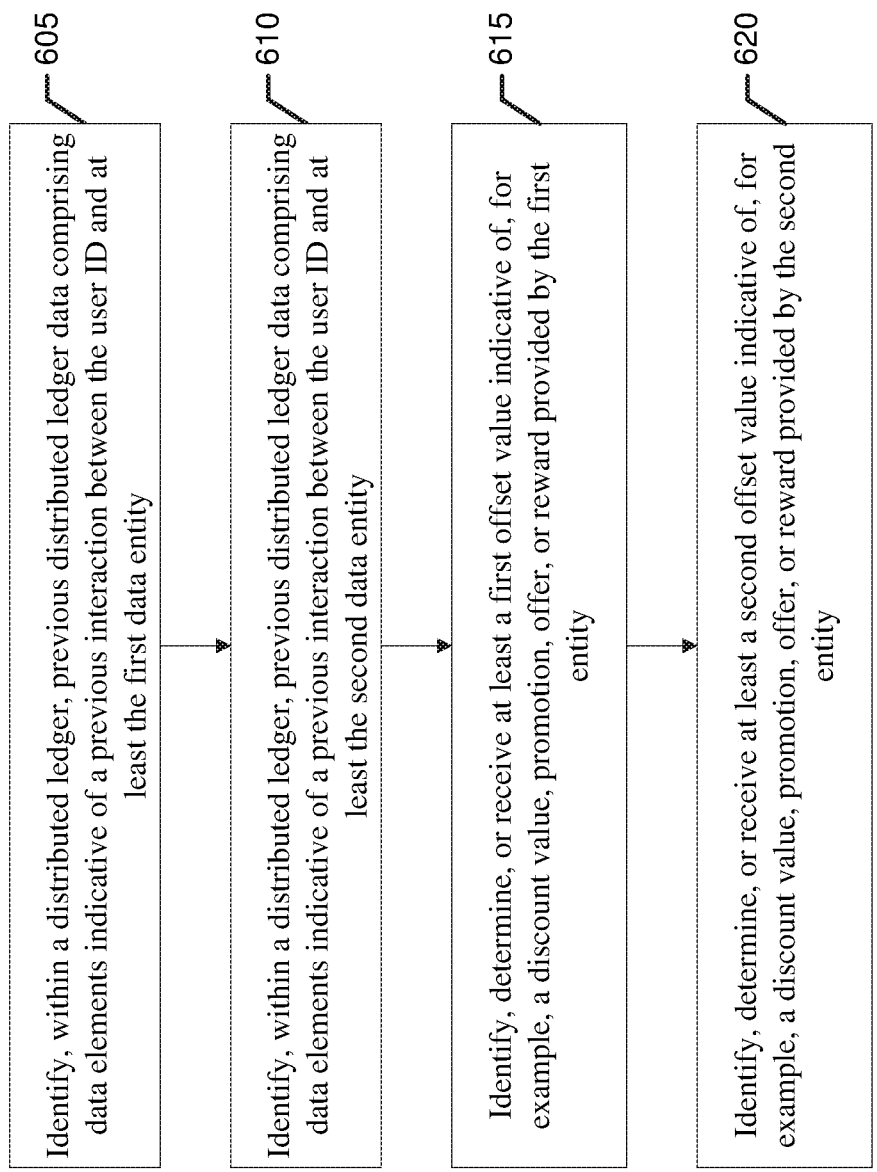

FACILITATING THE APPLICATION OF A LEDGER TO PROGRAMMATICALLY IDENTIFY DUPLICATE DATA OBJECTS INDICATIVE OF MULTIPLE CARD-LINKED OFFERS PROVIDED AGAINST A SINGLE TRANSACTION

CROSS-REFERENCE TO RELATED APPLICATIONS

This application claims priority to U.S. Provisional Application No. 62/555,381 filed Sep. 7, 2017, the content of which is incorporated herein by reference in its entirety.

TECHNOLOGICAL FIELD

Embodiments of the invention relate, generally, to facilitating the application of a ledger, or data structure in general, to programmatically identify duplicate data objects, such as those indicative of card-linked offers provided against a single transaction, and more specifically, to the utilization of a global ledger to identify stacking of card-linked offers.

BACKGROUND

When a consumer claims, buys or otherwise activates or otherwise claims multiple offers or loyalty programs from the same merchant and links them to one payment source (e.g., a credit card, mobile pay app, etc.), there is no industry recognized, pre-established systemic sequence in which the offers or programs get reconciled and applied that is understood by and fair to both consumers and merchants. Merchants have no control of the number of offers available or claimed for a specific offer over time, across multiple offers platforms, and as such, are less inclined to provide offers on multiple offer platforms.

The applicant has discovered problems with current methods, systems, and apparatuses and through applied effort, ingenuity, and innovation, Applicant has solved many of these identified problems by developing a solution that is embodied by the present invention, which is described in detail below.

BRIEF SUMMARY

In general, embodiments of the present invention provided herein include systems, methods, apparatuses, and computer readable media for facilitating the application of a ledger, or data structure in general, to programmatically identify duplicate data objects, such as those indicative of card-linked offers provided against a single transaction.

Other systems, methods, and features will be, or will become, apparent to one with skill in the art upon examination of the following figures and detailed description. It is intended that all such additional systems, methods, features to be included within this description, be within the scope of the disclosure, and be protected by the following claims.

In some embodiments, an apparatus may be provided comprising at least one processor and at least one memory including computer program code, the at least one memory and the computer program code configured to, with the processor, cause the apparatus to at least: receive, via a network, an indication of an interaction between a primary device and a third-party device, the indication comprising at least a first data element, a second data element, and a third data element, the first element indicative of user identification information, the second element indicative of third-party identification information, and the third data element indicative of an initial value; generate distributed ledger data, the distributed ledger data indicative of a previous interaction between the primary device and a first entity; cause transmission of the distributed ledger data to each of a plurality of nodes in a offerer network, each node comprising a respective computer with ledger storage; after a predetermined amount of time, cause performance of a comparison of the distributed ledger data against other distributed ledger data to determine that the first data entity and a second data entity each comprise corresponding data objects; apply a rule to generate an adjusted value; and transmit, to a value processor, a data object comprising at least the first data element, the second data element, and the adjusted value.

In some embodiments, the computer program code configured to cause performance of a comparison of the distributed ledger data against previous distributed ledger data to determine that a first data entity and a second data entity each comprise corresponding data objects, causes the apparatus to at least: identify, within a distributed ledger, previous distributed ledger data comprising data elements indicative of a previous interaction between the user ID and at least the first data entity; identify, within a distributed ledger, previous distributed ledger data comprising data elements indicative of a previous interaction between the user ID and at least the second date entity; identify at least a first offset value provided by the first entity; and identify a second offset value provided by the second entity.

In some embodiments, the computer program code is further configured to, with the processor, cause the apparatus to at least: receive, via the network from the first data entity, a first data object comprising a pointer to a particular data ledger entry in the distributed ledger data and a first offset value; and receive, via the network from the second data entity, a second data object comprising the pointer to the particular data ledger entry in the distributed ledger data and a second offset value.

In some embodiments, the computer program code is further configured to, with the processor, cause the apparatus to at least: call an application program interface (API) associated with each of the plurality of data entities; and receive a first data object from the first data entity indicative of a first offset value and a second date object from a second data entity indicative of a second offset value.

In some embodiments, the computer program code is further configured to, with the processor, cause the apparatus to at least: create a first set of renderable object data comprising the adjusted value; and transmit a control signal that causes the first set of renderable object data to be presented to a mobile device via a user interface of the mobile device.

In some embodiments, the computer program code is further configured to, with the processor, cause the apparatus to at least: create a second set of renderable object data comprising the adjusted value; and transmit a control signal that causes the second set of renderable object data to be presented at a second device via a user interface.

In some embodiments, the computer program code is further configured to, with the processor, cause the apparatus to at least: generate a new distributed ledger data comprising at least the first data element, the second data element, and a fourth data element, the first element indicative of user identification information, the second element indicative of third-party identification information, and the third data element indicative of the updated value; and cause transmission of the new distributed ledger data to each of the plurality of nodes in the offeror network.

In some embodiments, the computer program code is further configured to, with the processor, cause the apparatus to at least: receive, from the primary device via an antenna configured to communicate via short-range wireless network or a magnetic reading head configured to read magnetic stripe on a card, the indication of the interaction between the primary device and the third party device.

In some embodiments, a computer program product may be provided comprising at least one non-transitory computer-readable storage medium having computer-executable program code instructions stored therein, the computer-executable program code instructions comprising program code instructions for: receiving, via a network, an indication of an interaction between a primary device and a third-party device, the indication comprising at least a first data element, a second data element, and a third data element, the first element indicative of user identification information, the second element indicative of third-party identification information, and the third data element indicative of an initial value; generating distributed ledger data, the distributed ledger data indicative of a previous interaction between the primary device and a first entity; causing transmission of the distributed ledger data to each of a plurality of nodes in a offerer network, each node comprising a respective computer with ledger storage; after a predetermined amount of time, causing performance of a comparison of the distributed ledger data against other distributed ledger data to determine that the first data entity and a second data entity each comprise corresponding data objects; applying a rule to generate an adjusted value; and transmitting, to a value processor, a data object comprising at least the first data element, the second data element, and the adjusted value.

In some embodiments, the herein the computer-executable program code instructions configured to cause performance of a comparison of the distributed ledger data against previous distributed ledger data to determine that a first data entity and a second data entity each comprise corresponding data objects, further comprise program code instructions for: identifying, within a distributed ledger, previous distributed ledger data comprising data elements indicative of a previous interaction between the user ID and at least the first data entity; identifying, within a distributed ledger, previous distributed ledger data comprising data elements indicative of a previous interaction between the user ID and at least the second date entity; identifying at least a first offset value provided by the first entity; and identifying a second offset value provided by the second entity.

In some embodiments, the computer-executable program code instructions further comprise program code instructions for: receiving, via the network from the first data entity, a first data object comprising a pointer to a particular data ledger entry in the distributed ledger data and a first offset value; and receiving, via the network from the second data entity, a second data object comprising the pointer to the particular data ledger entry in the distributed ledger data and a second offset value.

In some embodiments, the computer-executable program code instructions further comprise program code instructions for: calling an application program interface (API) associated with each of the plurality of data entities; and receiving a first data object from the first data entity indicative of a first offset value and a second date object from a second data entity indicative of a second offset value.

In some embodiments, the computer-executable program code instructions further comprise program code instructions for: creating a first set of renderable object data comprising the adjusted value; and transmitting a control signal that causes the first set of renderable object data to be presented to a mobile device via a user interface of the mobile device.

In some embodiments, the computer-executable program code instructions further comprise program code instructions for: creating a second set of renderable object data comprising the adjusted value; and transmitting a control signal that causes the second set of renderable object data to be presented at a second device via a user interface.

In some embodiments, the computer-executable program code instructions further comprise program code instructions for: generating a new distributed ledger data comprising at least the first data element, the second data element, and a fourth data element, the first element indicative of user identification information, the second element indicative of third-party identification information, and the third data element indicative of the updated value; and causing transmission of the new distributed ledger data to each of the plurality of nodes in the offeror network.

In some embodiments, the computer-executable program code instructions further comprise program code instructions for: receiving, from the primary device via an antenna configured to communicate via short-range wireless network or a magnetic reading head configured to read magnetic stripe on a card, the indication of the interaction between the primary device and the third party device.

In some embodiments, a method may be provided, the method comprising: receiving, via a network, an indication of an interaction between a primary device and a third-party device, the indication comprising at least a first data element, a second data element, and a third data element, the first element indicative of user identification information, the second element indicative of third-party identification information, and the third data element indicative of an initial value; generating distributed ledger data, the distributed ledger data indicative of a previous interaction between the primary device and a first entity; causing transmission of the distributed ledger data to each of a plurality of nodes in a offerer network, each node comprising a respective computer with ledger storage; after a predetermined amount of time, cause performance of a comparison of the distributed ledger data against other distributed ledger data to determine that the first data entity and a second data entity each comprise corresponding data objects; applying a rule to generate an adjusted value; and transmitting, to a value processor, a data object comprising at least the first data element, the second data element, and the adjusted value.

In some embodiments, the causing performance of the comparison of the distributed ledger data against previous distributed ledger data to determine that a first data entity and a second data entity each comprise corresponding data objects, further comprises: identifying, within a distributed ledger, previous distributed ledger data comprising data elements indicative of a previous interaction between the user ID and at least the first data entity; identifying, within a distributed ledger, previous distributed ledger data comprising data elements indicative of a previous interaction between the user ID and at least the second date entity; identifying at least a first offset value provided by the first entity; and identifying a second offset value provided by the second entity.

In some embodiments, the method further comprises: receiving, via the network from the first data entity, a first data object comprising a pointer to a particular data ledger entry in the distributed ledger data and a first offset value;

and receiving, via the network from the second data entity, a second data object comprising the pointer to the particular data ledger entry in the distributed ledger data and a second offset value.

In some embodiments, the method further comprises: calling application program interface (API) associated with each of the plurality of data entities; and receiving a first data object from the first data entity indicative of a first offset value and a second date object from a second data entity indicative of a second offset value.

In some embodiments, the method further comprises: creating a first set of renderable object data comprising the adjusted value; and transmitting a control signal that causes the first set of renderable object data to be presented to a mobile device via a user interface of the mobile device.

In some embodiments, the method further comprises: creating a second set of renderable object data comprising the adjusted value; and transmitting a control signal that causes the second set of renderable object data to be presented at a second device via a user interface.

In some embodiments, the method further comprises: generating a new distributed ledger data comprising at least the first data element, the second data element, and a fourth data element, the first element indicative of user identification information, the second element indicative of third-party identification information, and the third data element indicative of the updated value; and causing transmission of the new distributed ledger data to each of the plurality of nodes in the offeror network.

In some embodiments, the method further comprises: receiving, from the primary device via an antenna configured to communicate via short-range wireless network or a magnetic reading head configured to read magnetic stripe on a card, the indication of the interaction between the primary device and the third party device.

BRIEF DESCRIPTION OF THE SEVERAL VIEWS OF THE DRAWINGS

Figure 1:
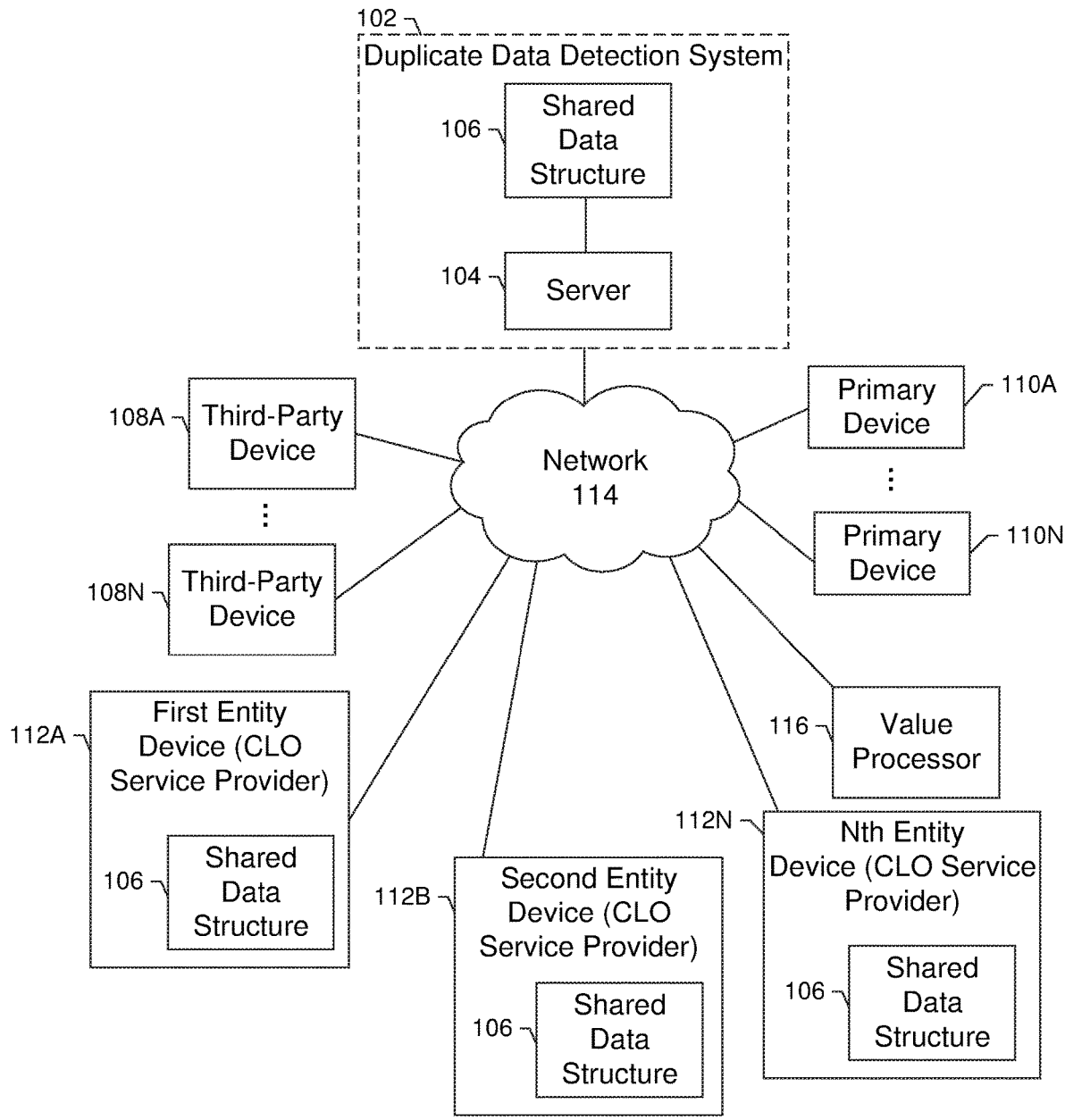

Having thus described embodiments of the invention in general terms, reference will now be made to the accompanying drawings, which are not necessarily drawn to scale, and wherein:

FIG. 1 shows an example system within which embodiments of the present invention may operate.

Figure 2:
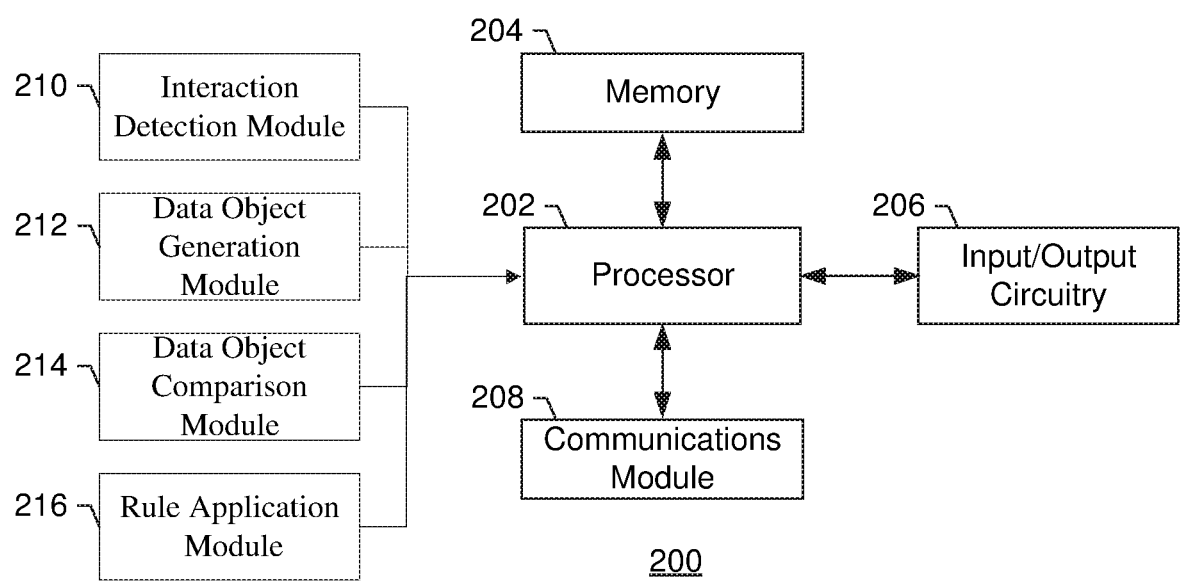

FIG. 2 shows a block diagram showing an example device for identifying duplicate data objects within a distributed data structure, using special-purpose circuitry in accordance with some exemplary embodiments of the present invention.

Figure 3:
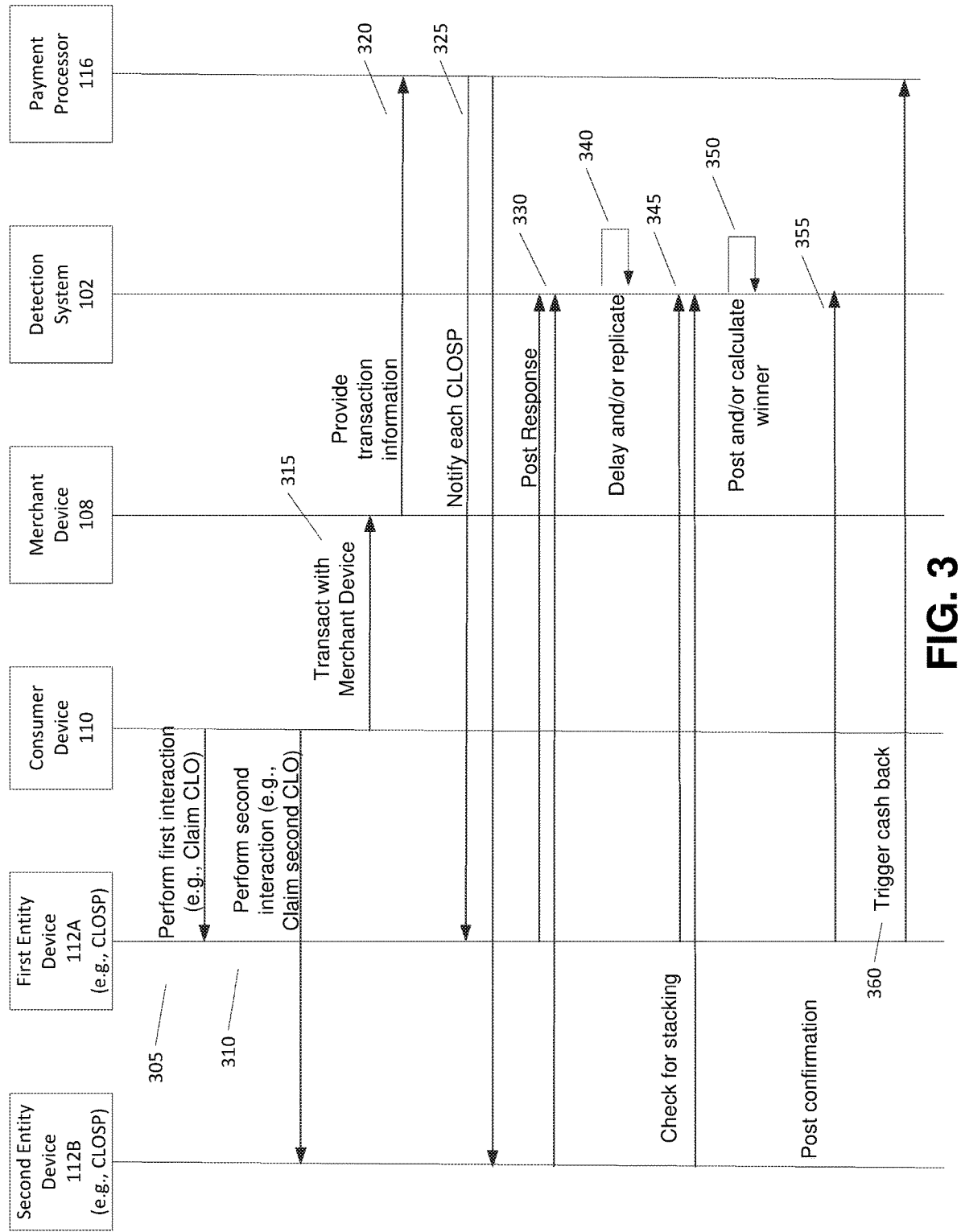

FIG. 3 shows a data flow diagram depicting data flow operations in accordance with some example embodiments discussed herein.

Figure 4:
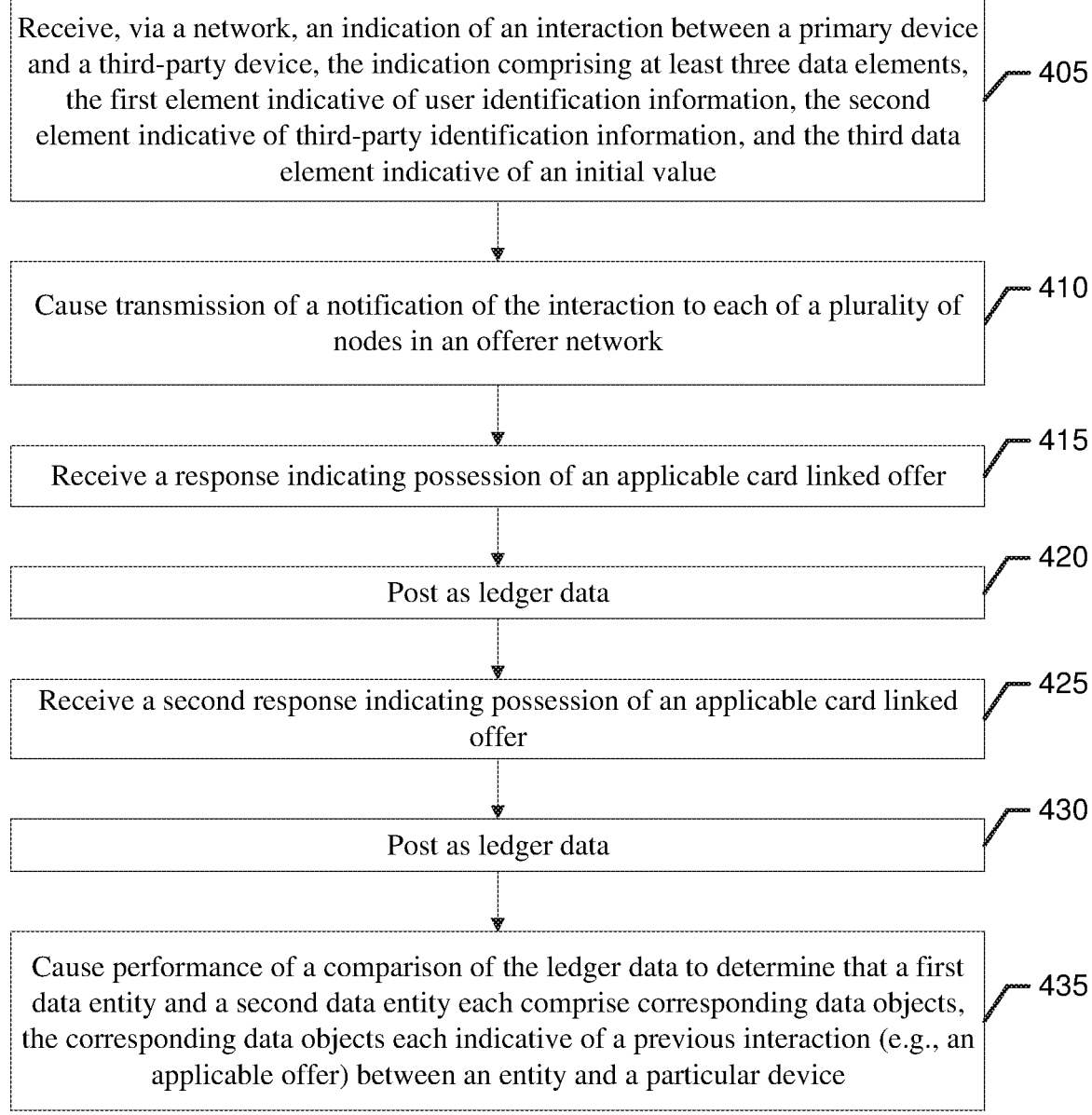
Figure 5:
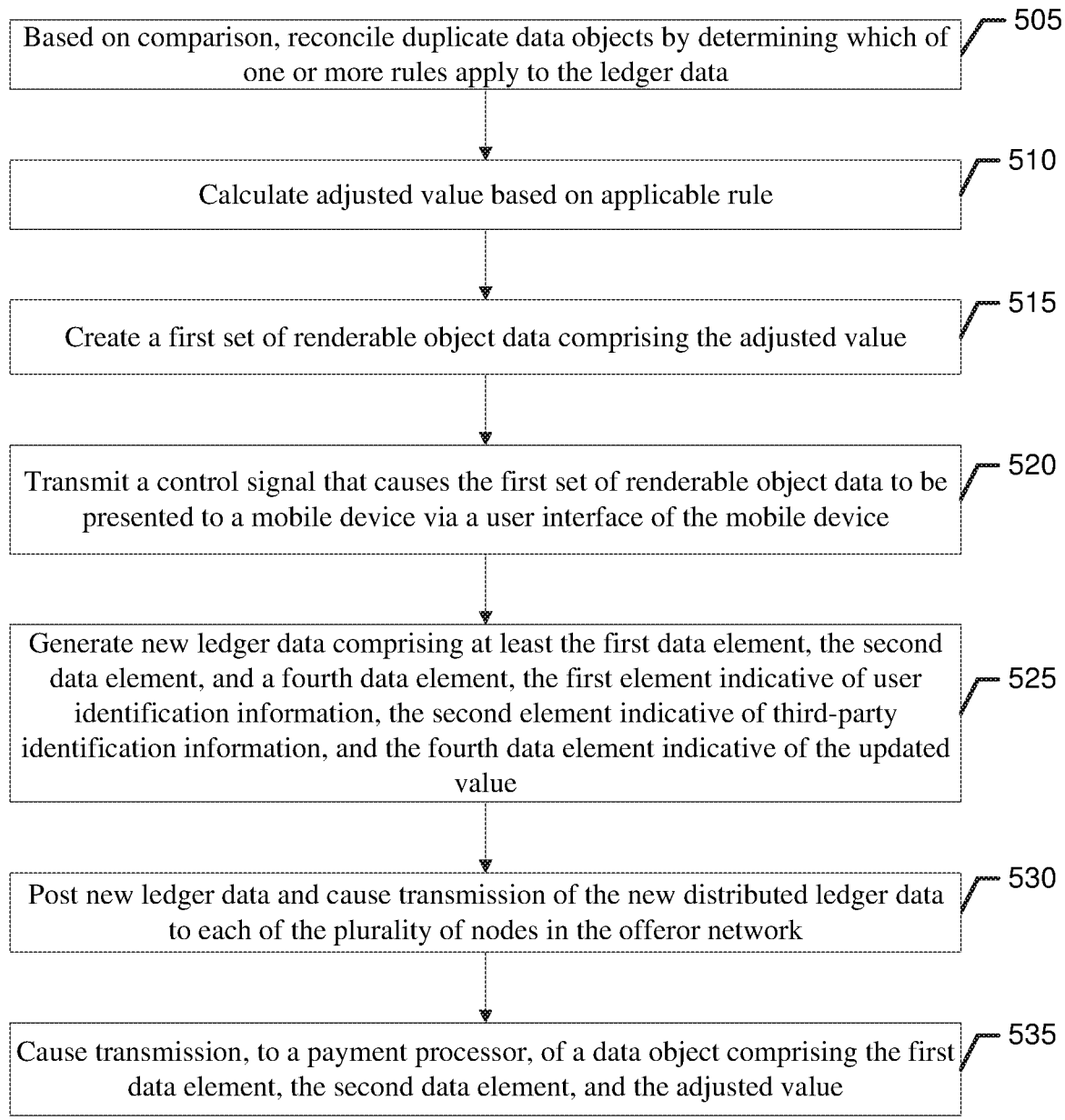

FIGS. 4 and 5 show flowcharts depicting example operations for programmatically identifying duplicate data objects within a distributed data structure, in accordance with some example embodiments discussed herein.

Figure 6B:
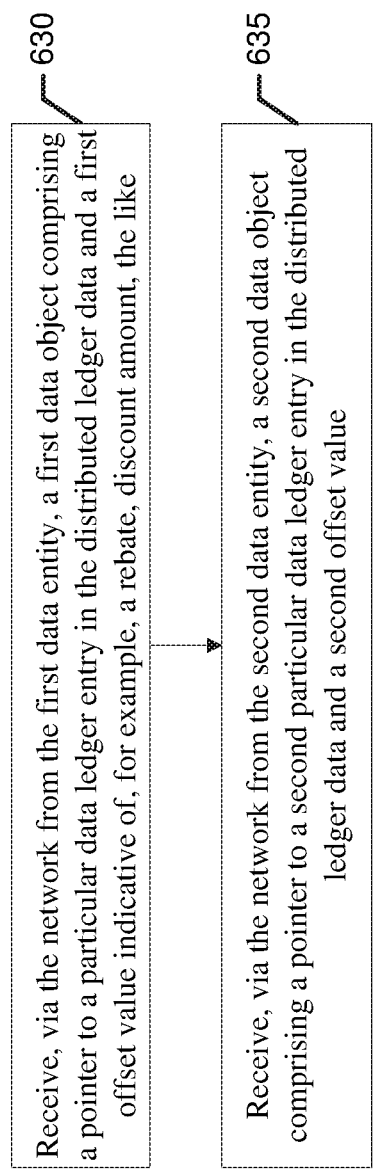
Figure 6C:
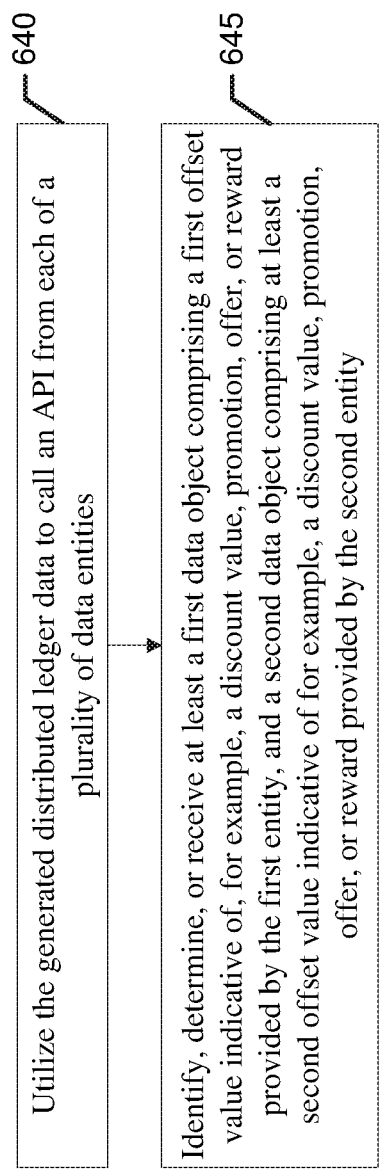

FIGS. 6A, 6B, and 6C show flowcharts show example operations for programmatically identifying duplicate data objects within a distributed data structure, in accordance with some example embodiments discussed herein.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Overview

Card Linked Offers (CLOs) allow CLO Service Providers to provide cash-back directly to a customer's card, when the customer uses the card to make a qualifying purchase at a designated merchant. The card is registered against the merchant with a data provider, such as Visa. The data provider informs the service provider of the transaction in real time and the service provider can trigger cash-back to the customer's card.

Stacking (or double dipping) occurs when the customer registers the same card with multiple service providers for a single merchant. When the customer transacts at that merchant, the customer should only receive one reward, unless the deals were intended to be combinable.

For example, a customer may register for a CLO offered by a first entity for 20% off Joe's Pizza. The also register for a CLO from a second entity for 15% off also at Joe's Pizza. When the customer goes to Joe's Pizza and swipes, the customer should only receive cash-back from one of the providers, not both.

There are two parts to solving the Stacking problem. The first is to identify that multiple service providers could potentially give cash back for a transaction. The second is to determine which one should get the business.

While others have provided solutions to address the second part, embodiments of the present inventions address the first. In particular, embodiments described herein may be configured to utilize a global ledger, a distributed data structure, Blockchain technology, etc. as a shared immutable transaction ledger. In some embodiments, all service providers would register all transactions they service on the transaction ledger, enabling duplicates to be identified before cash-back is triggered. Each transaction may be registered onto the Blockchain in a way that allows it to be universally identifiable but which also preserves the customer's privacy. The specific mechanism for achieving this is immaterial to the solution. The Cobra standard makes some suggestions in this area. A possible solution would be to create a tuple of the <Merchant Identifier, Hash of the credit card number, Transaction Amount, Transaction Timestamp> and take a one way hash of this. Additional metadata will need to be provided with the Hash to allow the servicer providers to determine which provider should win.

There are three levels at which the transaction ledger could be applied: open loop—the blockchain simply provides a shared transaction ledger. Each service provider can inspect the ledger to identify possible stacking. If they see that a customer transaction could be rewarded by multiple providers it is up to the providers to independently determine which of them should provider the reward; unique winner—at this second level the service provider who believes they have won posts a second time to the blockchain to publish their ownership of the transaction reward. The blockchain would be constructed to only allow one such post for each transaction. This guarantees that only one service provider wins. However it does not guarantee that the service providers consistent business logic to determine the winner; blockchain computation-advanced blockchain implementations such as Etherium allow code to be built into the blockchain itself. In this version the business logic for determining the winning service provider would be written into a blockchain transaction. This would ensure that the correct winner was chosen. Embodiments described herein are independent of the choice of blockchain technology or whether the blockchain used is public or private.

Aside from the multiple engineering issues that would need to be solved to create this system there are many high level design challenges that need to be designed correctly.

Deterministic—The client interaction with the Ledger needs to ensure that the rules can always be applied correctly. There should not be ambiguous states, for example, where one card linked offer service providers (CLOSP) may believe that they have won the refund, but after further processing discover that they have not.

Auditable—The transactions sent to the ledger should provide an unequivocal audit trail that will allow all members of the consortium to validate that the system is working correctly and all transactions are being assigned correctly according to the agreed rules.

Transaction matching—the system needs to store the customer-merchant transaction information with appropriate PII obfuscated (including CC number) but also ensure that transactions can be successfully matched and dedupe rules applied. Moreover some of the sources of transaction information for CLO do not have full CC PANs so provision should be made to support looser matching schemes for example matching on last 4 CC#, amount, time etc.

Definitions

The term "primary device" as used herein describes a user device (e.g., a mobile device) configured to interact with merchant device, entity device, or other third-party devices. Examples of a primary device may include a laptop, mobile device (e.g., smartphones and other mobile devices), tablet, personal computer, a chip embedded card, credit card, debit card, key fob, or combination of any of the above, or the like. The primary device is able to interact with a merchant or other third-party device in a number of different ways including wireless electronic communication, wired electronic communication, magnetic strip read, chip read, any processing of payment information resulting in detectable transaction, or the like.

The "third-party device" may be a device, a system of devices or a module operable to process or communicate in relation to a payment, such as a point-of-sale ("POS") machine, a mobile payment processing system, a cellular phone, a laptop, any intermediary device that could communicate with a POS machine, or the like. A third-party device may or may not communicate with a database in certain instances, such as in response to a consumer activity.

The term "interaction" as used herein refers to any type of communication between devices, including but not limited to, contactless payments, mobile payments, credit card payments (e.g., swipes), use of any positioning or location-based service, messaging (e.g., receiving or transmitting an electronic communication), connecting (i.e. via WIFI or a short-range wireless service), or the like.

As used herein, the term "merchant" may include, but is not limited to, a business owner, consigner, shopkeeper, tradesperson, vendor, provider, operator, entrepreneur, agent, dealer, organization or the like that is in the business of a providing a good, service or experience to a consumer, facilitating the provision of a good, service or experience to a consumer and/or otherwise operating in the stream of commerce. An example merchant may be a restaurant.

As used herein, the term "consumer" may include, but is not limited to, a client, customer, purchaser, shopper, user, or the like, who may be in the position to or does exchange value for one or more offers under the terms defined by one or more promotions. For example, and using the aforementioned restaurant as the example provider, a consumer may be an individual who activates, claims, or purchases an offer (e.g., $20 for $10) for redemption at the restaurant.

Technical Underpinnings and Implementation of Exemplary Embodiments

A duplicate data object detection system facilitates the application of a ledger, or data structure, to programmatically identify duplicate data objects, such as those indicative of card-linked offers provided against a single transaction.

When a consumer claims, buys or otherwise activates multiple promotions, offers, or loyalty programs from the same merchant and links them to one payment source (e.g., a credit card, mobile pay app, etc.), conventional systems do not provide any standard (e.g., industry recognized, pre-established systemic) sequence in which the multiple offers or loyalty program incentives get applied and reconciled that is understood by and fair to both consumers and merchants.

Moreover, merchants do not have visibility or control of the number of offer redemptions for a specific offer over time, across multiple offers platforms and publishers. This set of barriers creates a disincentive for merchants to provide offers on multiple offers platforms and creates a suboptimal consumer and merchant experience with using card-linked offers.

Embodiments described herein facilitate the application of a ledger, or data structure in general, to programmatically identify duplicate data objects, such as those indicative of card-linked offers provided against a single transaction, enabling fair and visible reconciliation. In particular, various embodiments of the present invention are directed to improved systems, apparatuses, methods, and computer readable media for programmatically performing duplicate data object detection within a global ledger, a data structure, a distributed data structure or the like. In particular, the various embodiments are directed to receiving an indication of a current interaction (e.g., a transaction between a consumer and merchant) from, for example, a payment processor, and, for example, via any number of methods (e.g., including swiping of a credit card linked to an offer, use of a mobile pay app linked to an offer, etc.), determining whether duplicate card linked offers have been linked to the payment option and need reconciliation before passing payment information to a payment processor. For example, embodiments of the present invention provide systems, devices, methods, and computer readable media directed to facilitating the application of a ledger, or data structure in general, to programmatically identify duplicate data objects, such as those indicative of card-linked offers provided against a single transaction.

System Architecture

FIG. 1 is a block diagram showing an exemplary system 100, which may include one or more devices and subsystems that are configured to implement embodiments discussed herein, and in particular, CLOs. CLOs are a voucherless offer system. Customers register to receive cash back at one or more merchants. Customers affect payment, typically using a credit card, they immediately receive a notification telling them that their reward is on its way and the cash amount is refunded to their card within a few days. In particular, a customer affects payment (credit card, mobile wallet etc.), the payment signal passes through many systems, for example: Merchant POS or payment terminal (e.g., Micros or Verifone), Payment provider (e.g., First Data), acquiring bank (e.g. Wells Fargo), credit card network (Visa, Mastercard, etc.), issuing back (bank that issued the card—e.g., Chase). CLO Service Providers (e.g., Groupon) get a notification from one or more of these payment systems that the payment occurred. Based on the information that CLO Service Providers receive, CLO Service Providers may be configured to inform the customer of a reward and start the payment.

Returning now to Figure, system 100 may include duplicate data object detection system 102, which may include, for example, server 104 and at least shared data structure 106 as well as, in some embodiments, databases including by not limited to a historical information database or the like. Duplicate data object detection system 102 may include any suitable network server and/or other type of processing device to communicate with third party devices and databases to facilitate the utilization of distributed data structures, and in particular, to programmatically identify duplicate data objects within a distributed data structure.

Merchants and consumers alike may access a duplicate data object detection system 102 via a network 112 (e.g., the Internet, or the like) using computing devices 108A through 108N and 110A through 110N, respectively (e.g., one or more merchant devices 108A-108N or one or more consumer devices 110A-110N). The duplicate data object detection system 102 may function to provide a merchant intelligence platform as described herein and below. Moreover, the duplicate data object detection system 102 may comprise a server 104 in communication with a database 106.

The server 104 may be embodied as a computer or computers as known in the art. The server 104 may provide for receiving of electronic data from various sources, including but not necessarily limited to the merchant devices 108A-108N and the consumer devices 110A-110N. For example, the server 104 may be operable to receive and process data provided by the merchant devices 108A-108N and the consumer devices 110A-110N. The server 104 may also facilitate e-commerce transactions based on transaction information provided by the merchant devices 108A-108N and the consumer devices 110A-110N. The server 104 may facilitate the generation and providing of various dynamic user interface and/or electronic communications based on the received electronic data.

Shared data structure 106 may be embodied as a data storage device such as a Network Attached Storage (NAS) device or devices, or as a separate database server or servers. Shared data structure 106 includes information accessed and stored by the server 104 to facilitate the operations of the duplicate data object detection system 102. For example, shared data structure 106 may include, without limitation, user account credentials for system administrators, merchants, and consumers, data indicating the card linked offers offered by the duplicate data object detection system, electronic marketing information, analytics, reports, financial data, and/or the like.

Merchant devices 108A-108N may be any computing device as known in the art and operated by a merchant. For example, merchant devices 108A-108N may include a merchant point-of-sale, a merchant local marketing device, a merchant e-commerce server, a merchant inventory system, or a computing device accessing a web site designed to provide merchant access (e.g., by accessing a web page via a browser using a set of merchant account credentials). Merchant devices 108A-108N may also be mobile devices as described above with respect to the consumer devices 108A-108N.

Electronic data received by the duplicate data object detection system 102 from merchant devices 108A-108N may also be provided in various forms and via various methods. For example, merchant devices 108A-108N may provide real-time notifications and/or status information as the requested services are assigned, scheduled, completed or the like. In other embodiments, merchant devices 108A-108N may be employed to provide information to the promotion and marketing service 102 to enable the duplicate data object detection system 102 to generate promotions or other marketing information to be provided to consumers.

Consumer device(s) 110A-110N may be any computing device as known in the art and operated by a consumer. Electronic data received by the server 104 from the consumer devices 110A-110N may be provided in various forms and via various methods. For example, consumer devices 110A-110N may include desktop computers, laptop computers, smartphones, netbooks, tablet computers, wearables, and the like. The information may be provided through various sources on these consumer devices.

In embodiments where a consumer devices 110 is a mobile device, such as a smart phone or tablet, the consumer device 110 may execute an "app" to interact with the duplicate data object detection system 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 10®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

In some embodiments, consumer device(s) 110A-110N may be implemented, at least in part, as a chip-embedded credit card, a cellular phone and/or other device capable of interacting with a third-party device, such as a smart phone, personal computer, laptop computer, mobile device, chip embedded card (e.g., a credit card, debit card, etc.) or a key fob, that may be used for any suitable purpose in addition to interacting with a third-party device via wired or wireless electronic communication, chip-read, magnetic strip read, etc.

Consumer device(s) 110A-110N may be configured to provide an indication of interaction, which may then be transmitted directly from one or more of consumer device(s) 110A-110N to Duplicate data object detection system 102 via a network.

Server 104 may be configured to provide information related to the indication of the interaction, which may then be transmitted directly from one or more of consumer device(s) 110A-110N to a payment processing system via a network, or transmitted indirectly via a server such as a server owned by a payment processing company.

Entity device(s) 112A-112N may be various card linked offer service providers configured for providing card linked offers, and/or loyalty programs, incentive, or rewards to consumers within the negotiated terms of a contract with merchants operating, for example, merchant devices 108A-108N. Each entity device may comprise or be configured to access, read from, write to shared data structure 106.

Example Apparatus for Implementing Embodiments of the Present Invention

Server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, interaction detection module 210, data object generation module, 212, data object comparison module 214, and rule application module 216. The apparatus 200 may be configured to execute the operations described above with respect to FIG. 1 and below with respect to FIGS. 3, 4, 5A, 5B, and 5C. Although these components 202-216 are described with respect to functional limitations, it should be understood that the particular implementations necessarily include the use of particular hardware. It should also be understood that certain of these components 202-216 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Interaction detection module 210 includes hardware configured to facilitate the reception of interaction data. Interaction detection module 210 may utilize processing circuitry, such as the processor 202, to perform these actions. Interaction detection module 210 may receive the data via a network interface provided by the communications circuitry 208. However, it should also be appreciated that, in some embodiments, interaction detection module 210 may include a separate processor, specially configured field programmable gate array (FPGA), or application specific interface circuit (ASIC) to perform the reception of interaction data. Interaction detection module 210 is therefore implemented using hardware components of the apparatus configured by either hardware or software for implementing these planned functions.

Data object generation module 212 includes hardware configured to generate renderable data object data. Data object management module 212 may utilize processing circuitry, such as the processor 202, to perform these actions. Data object generation module 212 may receive the data via a network interface provided by the communications circuitry 208. However, it should also be appreciated that, in some embodiments, data object generation module 212 may include a separate processor, specially configured field programmable gate array (FPGA), or application specific interface circuit (ASIC) to perform the generation renderable data object data. Data object generation module 212 is therefore implemented using hardware components of the apparatus configured by either hardware or software for implementing these planned functions.

Data object comparison module 214 includes hardware configured to facilitate the detection or identification of duplicate data objects. Data object comparison module 214 may utilize processing circuitry, such as the processor 202, to perform these actions. Data object comparison module 214 may receive the data via a network interface provided by the communications circuitry 208. However, it should also be appreciated that, in some embodiments, data object comparison module 214 may include a separate processor, specially configured field programmable gate array (FPGA), or application specific interface circuit (ASIC) to perform the detection or identification of duplicate data objects. Data object comparison module 214 is therefore implemented using hardware components of the apparatus configured by either hardware or software for implementing these planned functions.

Rule application module 216 includes hardware configured to identify, determine, arbitrate, or otherwise reconcile various rules related to, for example, the redemption of multiple promotions, offers, or loyalty programs, and subsequently, apply one or more rules in accordance therewith. Rule application module 216 may utilize processing circuitry, such as the processor 202, to perform these actions. Rule application module 216 may receive the data via a network interface provided by the communications circuitry 208. However, it should also be appreciated that, in some embodiments, rule application module 216 may include a separate processor, specially configured field programmable gate array (FPGA), or application specific interface circuit (ASIC) to perform the identification, determination, arbitration, or reconciliation of one or more various rules related to, for example, the redemption of multiple promotions, offers, or loyalty programs, and subsequently, the application of one or more rules in accordance therewith. Rule application module 216 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Exemplary Operations for Implementing Embodiments of the Present Invention

In some embodiments, the system may be configured for facilitating the application of a ledger, or data structure in general, to programmatically identify duplicate data objects, such as those indicative of multiple card-linked offers provided against a single transaction, the duplicate data objects being within the ledger. FIGS. 3 and 4 show exemplary processes for programmatically identifying duplicate data objects within a data structure. FIG. 5 shows an example method that may be executed by one or more machines, for example by duplicate data object detection system 102, apparatus 200, including processor 202, interaction detection module 210, data object generation module, 212, data object comparison module 214, and rule application module of FIG. 2, for programmatically identifying duplicate data objects within a distributed data structure, in accordance with some embodiments discussed herein.

Programmatically Identifying Duplicate Data Objects within a Distributed Data Structure FIG. 3 shows a dataflow diagram of an example process that, upon posting a transaction, programmatically notifies each of a plurality of card link offer service providers, who then post to the ledger, enabling the reconciliation of duplicate data objects within a ledger, in accordance with particular rules related thereto. A control signal may then be sent to a payment processing system indicative of an adjusted transaction amount, performed in accordance with some embodiments.

At 305, a consumer device 110 (e.g., a credit card, a mobile phone configured with a mobile payment app, or the like), operated by a consumer, may perform a first interaction (e.g., entering into, buying, claiming, etc. a first offer, etc.) with a first entity, such as a promotion and marketing system, a loyalty rewards program, or the like. At 310, consumer device 110, operated by a consumer, may perform a second interaction (e.g., entering into, buying, claiming, etc. a second offer, etc.) with a second entity, such as for example, a second promotion and marketing system, loyalty rewards program, or the like. In some instances, as will be described later, the same merchant may be the subject of both interactions, effectively providing the same consumer with two discounts redeemable, for example, on the same future transaction.

At 315, the consumer may affect payment to a merchant. For example, the consumer, again operating a consumer device 110, may perform a transaction at a merchant, for example, by buying a product or service. At 320, the merchant device 108 may post or otherwise provide information regarding the transaction to a payment processor 116. In some embodiments, in addition to or alternatively, the merchant device 108 may providing information regarding the transaction to detection system 102, and/or in some embodiments, to each of a plurality of nodes of a distributed data structure. At this point, the duplicate data object detection system 102 may be configured to identify any offers or deals that should be applied to the transaction. In some instances, the duplicate data object detection system 102 may find that the consumer may have claimed, bought, or otherwise have access to multiple offers that are each eligible to be applied to the transaction. Terms of service may, of course, prohibit and/or prevent this. And as such, the duplicate data object detection system 102 may be configured to identify those instances in which multiple offers may be eligible, determine the specific offers, apply a rule or set of rules to the situation, and notify each or subset of each related party, including the payment processor, of the outcome.

Referring back to FIG. 3, in some embodiments, subsequent to the merchant device 108 providing information regarding the transaction to a payment processor 116, the payment processor 116 may provide a notification to each of a plurality of card linked offer service providers indicative of the transaction, for example, at step 325. Here, for example, payment processor 116 may notify the first entity 112A and the second entity 112B. Upon notification, at step 330, each card linked offer service provider may post to the shared data structure 106, information indicative of a card linked offer claimed by the consumer. Subsequently, for example, after a predetermined amount of time, for example, shown as a delay or replication of the shared data structure 106, for example, among distributed entities, at step 340, each card linked offer service provider (e.g., the first entity 112A and the second 112B) that previously posted, for example, to shared data structure 106 or to the detection system 102, information indicative of an applicable or eligible card linked offer, may now check the shared data structure 106 for stacking. See step 345 where both the first entity 112A and the second entity 112B check for stacking.

In some embodiments, for example, in step 350, the duplicate detection system 102 may apply a set of rules or otherwise determine or calculate which card linked offer will apply to the transaction. In other embodiments, after a second predetermined amount of time, again step 350, each card linked offer service provider, here the first entity 112A and the second 112B, that posted information indicative of an applicable or eligible card linked offer may determine if, whether, or that, according to applicable rules, their card linked offer will apply to the transaction, and subsequently, at step 355, will post to the shared data structure 106 a confirmation of such a determination (e.g., as shown where first entity 112A posts confirmation indicating that the first card linked offer will apply to the transaction). Subsequently, for example, at step 360, a card linked offer service provider, for example, 112A, will notify the payment processor 116. In some embodiments, a card linked offer service provider, for example, 112A, will trigger the reward, the cash back, or the like, while in other embodiments, a card linked offer service provider, for example, 112A, will notify the payment processor 116 to trigger the reward, the cash back, or the like.

FIG. 4 depicts a flowchart of exemplary operations for a process 400 that may be executed by one or more apparatuses, for example, the server 104 of duplicate data object detection system 102, or a server of or associated with any of the card linked offer service providers, to facilitate the application of a ledger, a data structure in general, or distributed data structure, or more generally, shared data structure 106, to programmatically identify duplicate data objects, such as those indicative of multiple card-linked offers provided against a single transaction, in accordance with some embodiments.

As shown in block 405 of FIG. 4, an apparatus, such as apparatus 200, may be configured for receiving, via a network, an indication of an interaction (e.g., a transaction) between a primary device (e.g., a credit card, a mobile phone configured with a mobile payment app, or the like, operated by a consumer) and a third-party device (e.g., between a consumer and merchant). For example, an indication that a transaction has occurred may be received from, for example, a payment processor. In some embodiments, the indication may comprise, for example, at least three data elements (e.g., a first data element, a second data element, and a third data element). The first element may be indicative of user identification information (e.g., a credit card number or portion thereof, a hash of the credit card number, or the like), the second element may be indicative of third-party identification information (e.g., a merchant identifier), and the third data element may be indicative of an initial value (e.g., a cost, a payment amount, a transaction amount, or the like).

In some embodiments, a transaction timestamp may also be received, whereas in other embodiments, the transaction timestamp may be associated with the other information at the time it is received. In some embodiments, for example, a tuple may be generated comprising, for example, the <Merchant Identifier, Hash of the credit card number, Transaction Amount, Transaction Timestamp> and, in some embodiments, a one way hash of this information may be received.

That is, for example, in some embodiments, the duplicate data object detection system 102, and/or each of a plurality of nodes of a distributed data structure may receive, from a third party device (e.g., a merchant device, a payment processing device, or the like), an indication of a transaction, the transaction including receiving payment (e.g., via an antenna configured to communicate via a short-range wireless network or a magnetic reading head configured to read magnetic stripe on a card), the indication of the transaction between the primary device and the third party device. As described above, the primary device may be, for example, a credit card, a mobile phone executing a payment app, or the like.

In some embodiments, an apparatus, such as apparatus 200, may be configured for generating and/or posting distributed ledger data. The distributed ledger data configured may be transmitted by, received from, stored at, for example, each of a plurality of nodes in an offerer network, each node comprising a respective computer with ledger storage. Accordingly, as shown in block 410 of FIG. 4, an apparatus, such as apparatus 200, may be configured for causing transmission of a notification of the interaction to each of the plurality of nodes in an offerer network, each node comprising a respective computer with ledger storage.

As shown in block 415 of FIG. 4, an apparatus, such as apparatus 200, may be configured for receiving a response, an indication, or the like indicating possession of an applicable card linked offer. That is, upon providing notification of an indication of the transaction, one or more card linked offer providers may provide a response, for example by posting to the shared data structure or to the duplicate data detection system, that it possesses a card linked offer that may be applied to the transaction. As shown in block 420 of FIG. 4, an apparatus, such as apparatus 200, may be configured for posting the response to the ledger or, in particular, generating and/or posting distributed ledger data, the distributed ledger data indicative of a previous interaction (e.g., the claiming of a card-linked offer between the primary device (i.e. payment method) and a first entity (e.g., card linked offer provider). In some embodiments, the response may be posted directly or, alternatively, upon reception of the response, the duplicate data detection system may post the response or information indicative of the response to the ledger, for example, to notify other card linked offer providers of those card linked offers that may apply, letting each apply the agreed-upon rules to decipher which card linked offer will and/or should apply.

Similar to block 415 and 420, as shown in block 425 of FIG. 4, an apparatus, such as apparatus 200, may be configured for receiving, directly or posted directly to the shared data structure, a second response, a second indication, or the like indicating that, the poster and/or transmitter of the response, also has an applicable card linked offer. And as shown in block 430 of FIG. 4, an apparatus, such as apparatus 200, may be configured for posting the response to the ledger.

As shown in block 435 of FIG. 4, an apparatus, such as apparatus 200, may be configured for causing performance of a comparison of the ledger data to determine that a first data entity and a second data entity each comprise corresponding data objects, the corresponding data objects each indicative of a previous interaction (e.g., an applicable offer) between an entity and a particular device. In some embodiments, actual comparison may be done at one or more of the data entities, each utilizing the same, predefined rules for determining which offer will be applied to the transaction.

In some embodiments, the corresponding data objects may be two data objects, each indicative of a previous interaction (e.g., a transaction) between an entity (e.g., a promotion and marketing system, a loyalty rewards program, or the like) and a particular consumer, who may be operating multiple devices under a single account or linked account, and/or a particular consumer device, which may in some embodiments be associated with multiple user accounts.

FIG. 5 depicts a flowchart of exemplary operations for a process 500 that may be executed by one or more apparatuses, for example, the server 104 of duplicate data object detection system 102 or a server of or associated with any of the card linked offer service providers 112A-112N, to facilitate the application of a ledger, a data structure in general, distributed data structure, or a shared data structure, to reconcile each of a plurality duplicate data objects after programmatically identifying those duplicate data objects, such as those indicative of multiple card-linked offers provided against a single transaction, in accordance with some embodiments.

Once the comparison has been performed, and each of at least two previous interactions (e.g., between the user identified by the identification information and each of two different entities (e.g., card linked offer providers)) have been identified, a rule is applied to the initial value (e.g., the transaction amount). As shown in block 505 of FIG. 5, an apparatus, such as apparatus 200, may be configured for, based on the comparison, for example, described above, reconciling duplicate data objects by determining which of one or more rules apply to the ledger data.

As shown in block 510 of FIG. 5, an apparatus, such as apparatus 200, may be configured for calculating an adjusted value based on applicable rule. For example, in an instance in which two entities each provide a card linked offer, one being a 10% discount and the other being a 15% discount, the 15% discount would be applied. In this instance, the offset value (e.g., the 15% discount) would be subtracted from the initial value to calculate an adjusted value, which as will be described later, may be provided to a payment processor. CardLinX™ defines a standard called Cobra for identifying which deal or deals should win in each of a set of situations.

In some embodiments, upon application of the rule and determination of which card linked offer, or in some embodiments, offers, are to be applied to the transaction, and subsequent calculation of the adjusted value (e.g., the new cost including the applied card linked offer), the apparatus may be configured to communicate one or both that the card linked offer has been applied and what the new cost is and/or the discount is. As such, as shown in block 515 of FIG. 5, an apparatus, such as apparatus 200, may be configured for creating, in real-time, a first set of renderable object data comprising the adjusted value, for example, configured for real-time display at a mobile device operated by the user, via for example, a push notification, a text message, etc. Additionally or alternatively, the apparatus may be configured to create or generate a second set of renderable object data, for example, configured for real-time display at a device operated by the merchant at which the consumer transacted, again, via any of for example, a push notification, text message, etc. In other embodiments, the apparatus may be configured to generate renderable object data configured for transmission to any of various accounts, for example, in the form of an email to an email account, in the form of an account posting to a financial account, etc.

Accordingly, as shown in block 520 of FIG. 5, an apparatus, such as apparatus 200, may be configured for transmitting a control signal that causes the first set of renderable object data to be presented to a mobile device via a user interface of the mobile device. Additionally or alternatively, the apparatus may be configured for transmitting a control signal that causes the second set of renderable object data to be presented to a second device (e.g., a merchant device) via a user interface of the second device.

Again, in some embodiments, upon application of the rule and determination of which card linked offer or offers are to be applied to the transaction, and subsequent calculation of the adjusted value (e.g., the new cost including the applied CLO(s)), the apparatus may be configured to generate new or updated distributed ledger data. As shown in block 525 of FIG. 5, an apparatus, such as apparatus 200, may be configured for generating new ledger data comprising at least the first data element, the second data element, and a fourth data element, the first element indicative of user identification information, the second element indicative of third-party identification information, and the fourth data element indicative of the updated value.

Once generated, the new distributed ledger data may be provided to the nodes of the offerer network. As such, as shown in block 530 of FIG. 5, an apparatus, such as apparatus 200, may be configured for posting new ledger data and cause transmission of the new distributed ledger data to each of the plurality of nodes in the offeror network.

Again, in some embodiments, upon application of the rule and determination of which card linked offer or offers are to be applied to the transaction, and subsequent calculation of the adjusted value (e.g., the new cost including the applied CLO(s)), the apparatus may be configured for transmitting the relevant information to the payment processor, for example, enabling the payment processor to charge the consumer accordingly. As shown in block 535 of FIG. 5, an apparatus, such as apparatus 200, may be configured for causing transmission, to a payment processor, of a data object comprising the first data element, the second data element, and the adjusted value.

FIGS. 6A, 6B, and 6C each show a flowchart of an example method of performing the comparison described above with respect to Block 435 of FIG. 4.

FIG. 6A depicts a flowchart of exemplary operations for a process 600 that may be executed by one or more apparatuses, for example, the server 104 of duplicate data object detection system 102 or a server of or associated with any of the card linked offer service providers, to facilitate the comparison described above that may be executed by one or more machines, for example by apparatus 200, including processor 202 and/or data object comparison module 214 of FIG. 2, for programmatically identifying duplicate data objects within a distributed data structure, in accordance with some embodiments discussed herein. In particular, FIG. 6A depicts an exemplary embodiment in which the duplicate data object detection system 102 reviews prior entries of the distributed data structure to identify previous transactions that involve, for example, the consumer and the merchant.

As shown in block 605 of FIG. 6A, an apparatus, such as apparatus 200, may be configured for identifying, within a distributed ledger, previous distributed ledger data comprising data elements indicative of a previous interaction between the user ID and at least the first data entity. For example, upon claiming or buying a promotion of deal from a promotion and marketing system (e.g., the first entity), information regarding that transaction may be posted to the distributed data ledger, which may then be reviewed upon the attempted redemption of the promotion, deal, etc.

Similarly, as shown in block 610 of FIG. 6A, an apparatus, such as apparatus 200, may be configured for identifying, within a distributed ledger, previous distributed ledger data comprising data elements indicative of a previous interaction between the user ID and at least the second date entity. For example, upon claiming or buying a promotion of deal from a second promotion and marketing system (e.g., the second entity), information regarding that transaction may be posted to the distributed data ledger, which may then be reviewed upon attempted redemption of the promotion, deal, etc.

As shown in block 615 of FIG. 6A, an apparatus, such as apparatus 200, may be configured for identifying, determining, or receiving at least a first offset value indicative of, for example, a discount value, promotion, offer, or reward provided by the first entity. And as shown in block 620 of FIG. 6A, an apparatus, such as apparatus 200, may be configured for identifying, determining, or receiving at least a second offset value indicative of, for example, a discount value, promotion, offer, or reward provided by the second entity.

FIG. 6B depicts a flowchart of exemplary operations for a process 600B that may be executed by one or more apparatuses, for example, the server 104 of duplicate data object detection system 102, to facilitate the comparison described above that may be executed by one or more machines, for example by apparatus 200, including processor 202 and/or data object comparison module 214 of FIG. 2, for programmatically identifying duplicate data objects within a distributed data structure, in accordance with some embodiments discussed herein. In particular, FIG. 6B depicts an exemplary embodiment in which each of a plurality of entities that have previously provided promotions, deals, or the like to a consumer related to a merchant provides information regarding the prior entry indicative of that transaction within the distributed data structure to the duplicate data object detection system.

As shown in block 630 of FIG. 6B, an apparatus, such as apparatus 200, may be configured for receiving, via the network from the first data entity, a first data object comprising a pointer to a particular data ledger entry in the distributed ledger data and a first offset value indicative of, for example, a rebate, discount amount, the like. And subsequently, as shown in block 635 of FIG. 6B, an apparatus, such as apparatus 200, may be configured for receiving, via the network, from the second data entity, a second data object comprising a pointer to a second particular data ledger entry in the distributed ledger data and a second offset value.

FIG. 6C depicts a flowchart of exemplary operations for a process 600C that may be executed by one or more apparatuses, for example, the server 104 of duplicate data object detection system 102, to facilitate the comparison described above that may be executed by one or more machines, for example by apparatus 200, including processor 202 and/or data object comparison module 214 of FIG. 2, for programmatically identifying duplicate data objects within a distributed data structure, in accordance with some embodiments discussed herein. In particular, FIG. 6C depicts an exemplary embodiment in which a duplicate data object detection system 102 utilizes that distributed ledger data, for example, indicative of the interaction between the consumer and the merchant, to call an API if each of a plurality of entities that may have previously provided a promotion, deal, or the like to the consumer related to the merchant.

As shown in block 640 of FIG. 6C, an apparatus, such as apparatus 200, may be configured for utilizing the generated distributed ledger data to call an API from each of a plurality of data entities. Subsequently, as shown in block 645 of FIG. 6C, an apparatus, such as apparatus 200, may be configured for identifying, determining, or receiving at least a first data object comprising a first offset value indicative of, for example, a discount value, promotion, offer, or reward provided by the first entity, and a second data object comprising at least a second offset value indicative of for example, a discount value, promotion, offer, or reward provided by the second entity.

FIGS. 3, 4, 5, and 6A-6C illustrate example flowcharts of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other devices associated with execution of software including one or more computer program instructions.

For example, in reference to FIGS. 3, 4, 5, and 6A-6C, one or more of the procedures described herein may be embodied by computer program instructions. In this regard, the computer program instructions which embody the procedures described above may be stored by a memory 204 of an apparatus employing an embodiment of the present invention and executed by a processor 202 in the apparatus.

As will be appreciated by one of ordinary skill in the art, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 3, 4, 5, and 6A-6C when executed, convert a computer or processing circuitry into a particular machine configured to perform an example embodiment of the present invention. Accordingly, the operations of FIGS. 3, 4, 5, and 6A-6C define an algorithm for configuring a computer or processing to perform an example embodiment. In some cases, a general purpose computer may be provided with an instance of the processor which performs the algorithms of FIGS. 3, 4, 5, and 6A-6C to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments, additional optional operations may also be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus comprising at least one processor and at least one memory including computer program code, the at least one memory and the computer program code configured to, with the at least one processor, cause the apparatus to at least:

write, via the at least one processor, a rule into a shared immutable blockchain, the rule comprising logic configured to reconcile how two or more offers are applied to transactions comprising a purchase of a good or service;

receive, via a network, an indication of an interaction between a primary device and a third-party device, the interaction comprising a purchase of the good or service, the indication comprising at least a first data element, a second data element, and a third data element, the first data element indicative of user identification information corresponding to the interaction, the second data element indicative of third-party identification information, and the third data element indicative of an initial value;

generate, via the at least one processor, distributed ledger data, the distributed ledger data indicative of the interaction between the primary device and the third-party device;

transmit the distributed ledger data to each of a plurality of nodes in an offeror network, including at least a first entity and a second entity, for storage on the shared immutable blockchain, each node comprising a respective computer with shared data structure storage configured to store all transactions, locally, on the shared immutable blockchain and transmit an indication thereof;

receive an indication from each of the plurality of nodes that the distributed ledger data has been stored, locally, on the shared immutable blockchain, after a predetermined amount of time, compare, by the at least one processor, the user identification information associated with the stored, distributed ledger data against at least one data value of other, previously stored, distributed ledger data on the shared immutable blockchain and determine, based on the comparison, that one or more previous entries on the shared immutable blockchain comprise both (1) information indicative of a previous interaction between the primary device and the first data entity, in which the user identification information was received and (2) information indicative of a previous interaction between the primary device and a second data entity, in which the user identification information was received, wherein the stored, distributed ledger data and the other, previously stored, distributed ledger data are both stored locally and at each of the plurality of nodes on the network via the locally stored version of the shared immutable blockchain, enabling the comparison to be auditable at each of the plurality of nodes on the network, determine, via the at least one processor, from other, previously stored, distributed ledger data on the shared immutable blockchain and based at least in part on the determination that the one or more previous entries comprise both (1) and (2), an existence of at least two applicable offers that can be applied to the purchase of the good or service associated with the indication, identify, via the at least one processor, from the locally stored version of the shared immutable blockchain, the rule;

apply, via the at least one processor and subsequent to the determination of the existence of the at least two applicable offers, the identified rule to generate an adjusted value based at least in part on a selected offset corresponding to one of the at least two applicable offers; and in real-time in response to generation of the adjusted value, transmit, via the at least one processor, to a value processor, a data object comprising at least the first data element, the second data element, and the adjusted value, wherein the data object causes the value processor to process the adjusted value in response to receiving the transmission.

2. The apparatus according to claim 1, wherein the computer program code configured to compare the distributed ledger data against the other distributed ledger data, causes the apparatus to at least:

identify, within the distributed ledger data stored in the shared data structure storage by processing the distributed ledger data, previous distributed ledger data comprising data elements indicative of (1) the information indicative of the previous interaction between the primary device and the first data entity, in which the user identification information was received;

identify, within the distributed ledger data stored in the shared data structure storage by processing the distributed ledger data, previous distributed ledger data comprising data elements indicative of (2) the information indicative of the previous interaction between the primary device and the second data entity;

identify at least a first offset value provided by the first data entity; and identify a second offset value provided by the second data entity.

3. The apparatus according to claim 1, wherein the computer program code is further configured to, with the processor, cause the apparatus to at least:

receive, via the network from the first data entity in response to the transmission of the distributed ledger data, a first data object comprising a first pointer to a first particular data ledger entry in the distributed ledger data and a first offset value; and receive, via the network from the second data entity in response to the transmission of the distributed ledger data, a second data object comprising a second pointer to a second particular data ledger entry in the distributed ledger data and a second offset value.

4. The apparatus according to claim 1, wherein the computer program code is further configured to, with the processor, cause the apparatus to at least:

call an application program interface (API) associated with each of a plurality of data entities determined to possibly have provided at least one applicable offer associated with the third-party identification information; and receive a first data object from the first data entity indicative of a first offset value and a second date object from a second data entity indicative of a second offset value, the first data object corresponding to a first portion of the other, previously stored, distributed ledger data and the second data object corresponding to a second portion of the other, previously stored, distributed ledger data.

5. The apparatus according to claim 1, wherein the computer program code is further configured to, with the processor, cause the apparatus to at least:

in real-time and in response to generation of the adjusted value, create a first set of renderable object data comprising the adjusted value; and in real-time, transmit a control signal that causes the first set of renderable object data to be presented to the primary device or a mobile device associated with the primary device, via a user interface.

6. The apparatus according to claim 1, wherein the computer program code is further configured to, with the processor, cause the apparatus to at least:

in real-time and in response to generation of the adjusted value, create a second set of renderable object data comprising the adjusted value; and in real-time, transmit a control signal that causes the second set of renderable object data to be presented at a second device associated with the selected offset, the second set of renderable object data presented via a user interface of the second device.

7. The apparatus according to claim 1, wherein the computer program code is further configured to, with the processor, cause the apparatus to at least:

generate a new distributed ledger data comprising at least the first data element, the second data element, and a fourth data element, the first data element indicative of user identification information, the second data element indicative of third-party identification information, and the fourth data element indicative of the updated value; and transmit the new distributed ledger data to each of the plurality of nodes in the offeror network.

8. The apparatus according to claim 1, wherein the computer program code is further configured to, with the processor, cause the apparatus to at least:

receive, from the primary device via an antenna configured to communicate via short-range wireless network or a magnetic reading head configured to read magnetic stripe on a card, the indication of the interaction between the primary device and the third-party device.

9. The apparatus according to claim 1, wherein to transmit the distributed ledger data to each of a plurality of nodes in the offeror network comprises:

transmit the distributed ledger data to a first node associated with the first data entity that causes the first node to directly post, to the shared immutable blockchain and in response to transmission of the distributed ledger data, first response distributed ledger data indicating the previous interaction between the primary device and the first data entity;

transmit the distributed ledger data to a second node associated with the second data entity that causes the second node to directly post, to the shared immutable blockchain and in response to transmission of the distributed ledger data, second response distributed ledger data indicating the previous interaction between the primary device and the second data entity; and identify at least the first response distributed ledger data
and the second response distributed ledger data by
monitoring the shared immutable blockchain without
additional transmission from the first data entity or the
second data entity.

10. The apparatus according to claim 9, wherein to cause at least the first node associated with the first data entity to directly post, to the shared immutable blockchain, the first response distributed ledger data, the computer program code configured causes the apparatus to at least
call an application program interface associated with the first data entity, wherein the apparatus determines a first data object indicative of a first offset value from the shared immutable blockchain subsequent to the call of the application program interface.

11. The apparatus according to claim 1, wherein the apparatus is further caused to:
generate new distributed ledger data representing the adjusted value corresponding to the interaction; and
transmit the new distributed ledger data to each of the plurality of nodes for storage via the shared immutable blockchain.

12. A computer program product comprising at least one non-transitory computer-readable storage medium having computer-executable program code instructions stored therein, the computer-executable program code instructions comprising program code instructions for:
writing, by a processor, a rule into a shared immutable blockchain, the rule comprising logic configured to reconcile how two or more offers are applied to transactions comprising a purchase of a good or service;
receiving, via a network, an indication of an interaction between a primary device and a third-party device, the interaction comprising a purchase of the good or service, the indication comprising at least a first data element, a second data element, and a third data element, the first data element indicative of user identification information corresponding to the interaction, the second data element indicative of third-party identification information, and the third data element indicative of an initial value;
generating, by h processor, distributed ledger data, the distributed ledger data indicative of the interaction between the primary device and the third-party device;
transmitting the distributed ledger data to each of a plurality of nodes in an offeror network, including at least a first entity and a second entity, for storage on the shared immutable blockchain, each node comprising a respective computer with shared data structure storage configured to store all transactions, locally, on the shared immutable blockchain and transmit an indication thereof;
receiving an indication from each of the plurality of nodes that the distributed ledger data has been stored, locally, on the shared immutable blockchain,
after a predetermined amount of time, comparing, by the processor, the user identification information associated with the stored, distributed ledger data against at least one data value of other, previously stored, distributed ledger data on the shared immutable blockchain and determine, based on the comparison, that one or more previous entries on the shared immutable blockchain comprise both (1) information indicative of a previous interaction between the primary device and the first data entity, in which the user identification information was received and (2) information indicative of a previous interaction between the primary device and a second data entity, in which the user identification information was received, wherein the stored, distributed ledger data and the other, previously stored, distributed ledger data are both stored locally and at each of the plurality of nodes on the network via the locally stored version of the shared immutable blockchain, enabling the comparison to be auditable at each of the plurality of nodes on the network,
determining, by the processor, from other, previously stored, distributed ledger data on the shared immutable blockchain and based at least in part on the determination that the one or more previous entries comprise both (1) and (2), an existence of at least two applicable offers that can be applied to the purchase of the good or service associated with the indication,
identifying, by the processor, from the locally stored version of the shared immutable blockchain, the rule;
applying, by the processor and subsequent to the determination of the existence of the at least two applicable offers, the identified rule to generate an adjusted value based at least in part on a selected offset corresponding to one of the at least two applicable offers; and
in real-time in response to generation of the adjusted value, transmitting, to a value processor, a data object comprising at least the first data element, the second data element, and the adjusted value,
wherein the data object causes the value processor to process the adjusted value in response to receiving the transmission.

13. The computer program product according to claim 12, wherein the herein the computer-executable program code instructions configured to compare the distributed ledger data against the other distributed ledger data, further comprise program code instructions for:
identifying, within the distributed ledger data stored in the shared data structure storage by processing the distributed ledger data, previous distributed ledger data comprising data elements indicative of (1) the information indicative of the previous interaction between the primary device and the first data entity, in which the user identification information was received;
identifying, within the distributed ledger data stored in the shared data structure storage by processing the distributed ledger data, previous distributed ledger data comprising data elements indicative of (2) the information indicative of the previous interaction between the primary device and the second data entity;
identifying at least a first offset value provided by the first data entity; and
identifying a second offset value provided by the second data entity.

14. The computer program product according to claim 12, wherein the computer-executable program code instructions further comprise program code instructions for:
receiving, via the network from the first data entity in response to transmission of the distributed ledger data, a first data object comprising a pointer to a first particular data ledger entry in the distributed ledger data and a first offset value; and
receiving, via the network from the second data entity in response to transmission of the distributed ledger data, a second data object comprising a second pointer to a second particular data ledger entry in the distributed ledger data and a second offset value.

15. The computer program product according to claim 12, wherein the computer-executable program code instructions further comprise program code instructions for:

calling an application program interface (API) associated with each of a plurality of data entities determined to possible have provided at least one applicable offer associated with the third-party identification information; and receiving a first data object from the first data entity indicative of a first offset value and a second date object from a second data entity indicative of a second offset value, the first data object corresponding to a first portion of the other, previously stored, distributed ledger data and the second data object corresponding to a second portion of the other, previously stored, distributed ledger data.

16. The computer program product according to claim 12, wherein the computer-executable program code instructions further comprise program code instructions for:

in real-time and in response to generation of the adjusted value, creating a first set of renderable object data comprising the adjusted value; and in real-time, transmitting a control signal that causes the first set of renderable object data to be presented to the primary device or a mobile device associated with the primary device, via a user interface.

17. The computer program product according to claim 12 wherein the computer-executable program code instructions further comprise program code instructions for:

in real-time and in response to veneration of the adjusted value, creating a second set of renderable object data comprising the adjusted value; and in real-time, transmitting a control signal that causes the second set of renderable object data to be presented at a second device associated with the selected offset, the second set of renderable object data presented via a user interface of the second device.

18. A method, the method comprising:

writing, by a processor, a rule into a shared immutable blockchain, the rule comprising logic configured to reconcile how two or more offers are applied to transactions comprising a purchase of a good or service;

receiving, via a network, an indication of an interaction between a primary device and a third-party device, the interaction comprising a purchase of the good or service, the indication comprising at least a first data element, a second data element, and a third data element, the first data element indicative of user identification information corresponding to the interaction, the second data element indicative of third-party identification information, and the third data element indicative of an initial value;

generating, by the processor, distributed ledger data, the distributed ledger data indicative of the interaction between the primary device and the third-party device;

transmitting the distributed ledger data to each of a plurality of nodes in an offeror network, including at least a first entity and a second entity, for storage on the shared immutable blockchain, each node comprising a respective computer with shared data structure storage configured to store all transactions, locally, on the shared immutable blockchain and transmit an indication thereof;

receiving an indication from each of the plurality of nodes that the distributed ledger data has been stored, locally, on the shared immutable blockchain, after a predetermined amount of time, comparing, by the processor, the user identification information associated with the stored, distributed ledger data against at least one data value of other, previously stored, distributed ledger data on the shared immutable blockchain and determine, based on the comparison, that one or more previous entries on the shared immutable blockchain comprise both (1) information indicative of a previous interaction between the primary device and the first data entity, in which the user identification information was received and (2) information indicative of a previous interaction between the primary device and a second data entity, in which the user identification information was received, wherein the stored, distributed ledger data and the other, previously stored, distributed ledger data are both stored locally and at each of the plurality of nodes on the network via the a locally stored version of the shared immutable blockchain, enabling the comparison to be auditable at each of the plurality of nodes on the network, determining, by the processor, from other, previously stored, distributed ledger data on the shared immutable blockchain and based at least in part on the determination that the one or more previous entries comprise both (1) and (2), an existence of at least two applicable offers that can be applied to the purchase of the good or service associated with the indication, identifying, by the processor, from the locally stored version of the shared immutable blockchain, the rule;

applying, by the processor, and subsequent to the determination of the existence of the at least two applicable offers, the identified rule to generate an adjusted value based at least in part on a selected offset corresponding to one of the at least two applicable offers; and in real-time in response to generation of the adjusted value, transmitting, to a value processor, a data object comprising at least the first data element, the second data element, and the adjusted value, wherein the data object causes the value processor to process the adjusted value in response to receiving the transmission.

19. The computer program product according to claim 12, wherein the computer-executable program code instructions further comprise program code instructions for:

receiving, from the primary device via an antenna configured to communicate via short-range wireless network or a magnetic reading head configured to read magnetic stripe on a card, the indication of the interaction between the primary device and the third-party device.

20. A method, the method comprising:

receiving, via a network, an indication of an interaction between a primary device and a third-party device, the interaction comprising a purchase of a good or service, the indication comprising at least a first data element, a second data element, and a third data element, the first data element indicative of user identification information, the second data element indicative of third-party identification information, and the third data element indicative of an initial value;

generating, by a processor, distributed ledger data, the distributed ledger data indicative of the interaction between the primary device and the third-party device;

transmitting the distributed ledger data to each of a plurality of nodes in an offeror network, including at least a first entity and a second entity, for storage via a shared immutable blockchain, each node comprising a respective computer with ledger storage configured to store all transactions, locally, on the shared immutable blockchain and transmit an indication thereof;

receiving an indication from each of the plurality of nodes that the distributed ledger data has been stored, locally, on the shared immutable blockchain;

after a predetermined amount of time, comparing, by the processor, the user identification information associated with the stored, distributed ledger data against at least one data value of other, previously stored, distributed ledger data on the shared immutable blockchain and determine, based on the comparison, that one or more previous entries on the shared immutable blockchain comprise both (1) information indicative of a previous interaction between the primary device and the first data entity, in which the user identification information was received and (2) information indicative of a previous interaction between the primary device and a second data entity, in which the user identification information was received, wherein the stored, distributed ledger data and the other, previously stored, distributed ledger data are both stored locally and at each of the plurality of nodes on the network, enabling the comparison to be auditable at each of the plurality of nodes on the network via a locally stored version of the shared immutable blockchain;

determining, from the other, previously stored, distributed ledger data and subsequent to the determination that the one or more previous entries comprise both (1) and (2), an existence of at least two portions of the other, previously stored, distributed ledger data representing applicable offers that can be applied to the purchase of the good or service;

applying, by the processor, and subsequent to the determination of the existence of at least two applicable offers that can be applied to the purchase of the good or service, a rule to the applicable offer data to generate an adjusted value based at least in part on a selected offset corresponding to one of the at least two applicable offers; and in real-time in response to generation of the adjusted value, transmitting, to a value processor, a data object comprising at least the first data element, the second data element, and the adjusted value, wherein the data object causes the value processor to process the adjusted value in response to receiving the transmission.

21. The method according to claim 20, wherein the comparing of the distributed ledger data against the other distributed ledger data further comprises:

identifying, within the distributed ledger data stored in the shared data structure storage by processing the distributed ledger data, previous distributed ledger data comprising data elements indicative of (1) the information indicative of the previous interaction between the primary device and the first data entity, in which the user identification information was received;

identifying, within the distributed ledger data stored in the shared data structure storage by processing the distributed ledger data, previous distributed ledger data comprising data elements indicative of (2) the information indicative of the previous interaction between the primary device and the second data entity;

identify at least a first offset value provided by the first data entity; and identifying a second offset value provided by the second data entity.

22. The method according to claim 20, wherein the method further comprises:

receiving, via the network from the first data entity in response to the transmission of the distributed ledger data, a first data object comprising a pointer to a first particular data ledger entry in the distributed ledger data and a first offset value; and receiving, via the network from the second data entity in response to the transmission of the distributed ledger data, a second data object comprising a second pointer to the second particular data ledger entry in the distributed ledger data and a second offset value.

23. The method according to claim 20, wherein the method further comprises:

calling application program interface (API) associated with each of a plurality of data entities determined to possible have provided at least one applicable offer associated with the third-party identification information; and receiving a first data object from the first data entity indicative of a first offset value and a second date object from a second data entity indicative of a second offset value, the first data object corresponding to a first portion of the other, previously stored, distributed ledger data and the second data object corresponding to a second portion of the other, previously stored, distributed ledger data.

* * * * *